Feb. 17, 1925.  
J. H. OLSON  
1,526,432  
LOCKING DEVICE FOR DUMPING CAR BODIES  
Filed Aug. 18, 1922
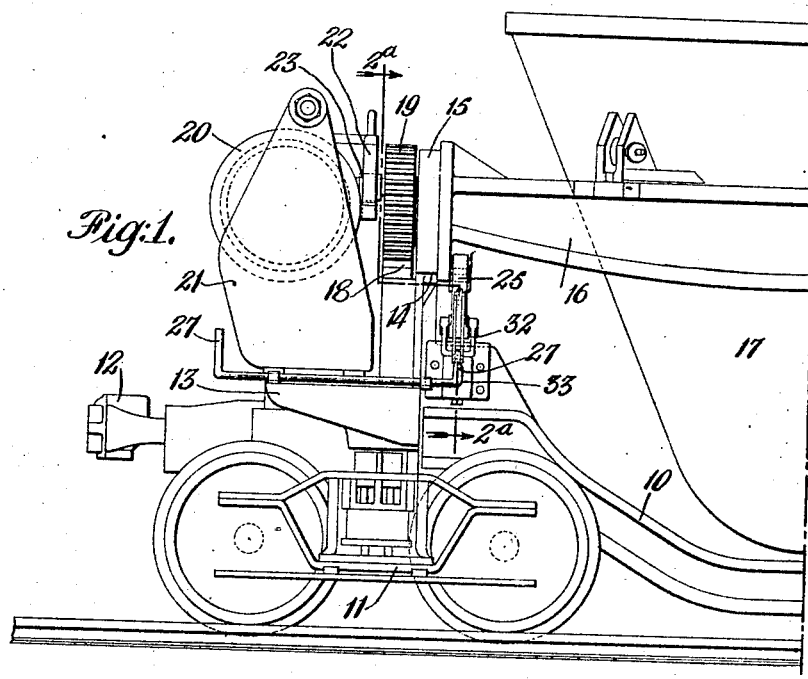
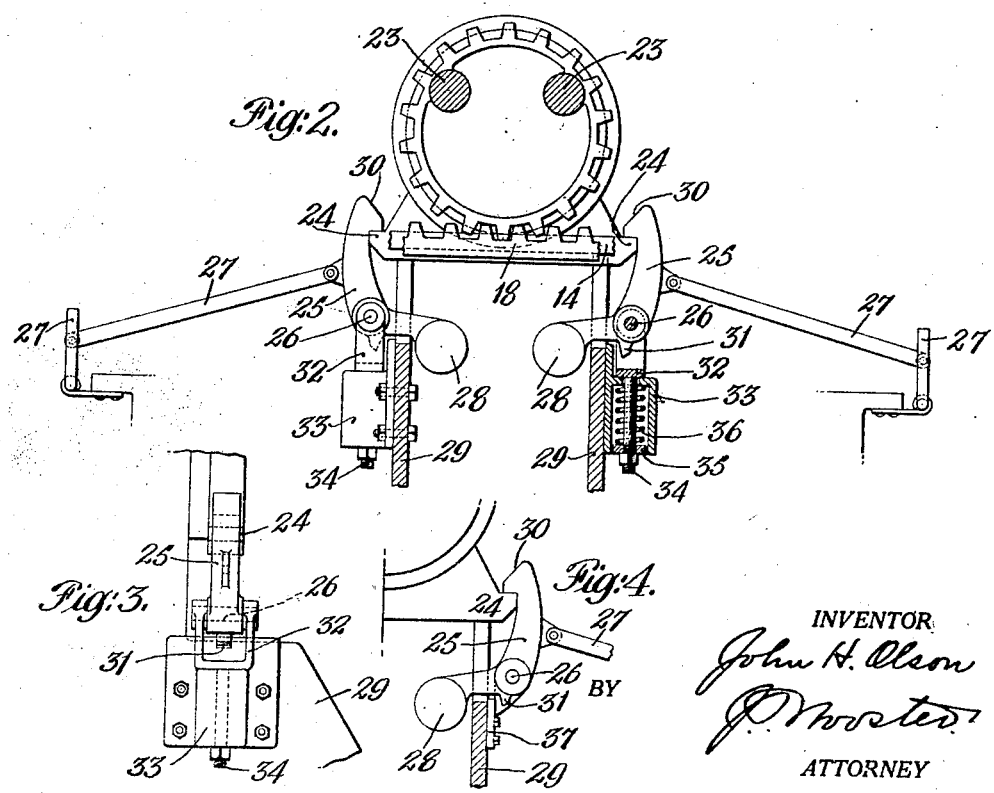
INVENTOR
John H. Olson
BY
ATTORNEY Patented Feb. 17, 1925.

1,526,432

UNITED STATES PATENT OFFICE.

JOHN H. OLSON, OF NEW YORK, N. Y., ASSIGNOR TO M. H. TREADWELL COMPANY, A CORPORATION OF NEW YORK.

LOCKING DEVICE FOR DUMPING-CAR BODIES.

Application filed August 18, 1922. Serial No. 582,586.

*To all whom it may concern:*

Be it known that I, JOHN H. OLSON, a citizen of Sweden, and resident of New York city, in the county of New York and State of New York, have invented certain new and useful Improvements in Locking Devices for Dumping-Car Bodies, of which the following is a specification.

The present invention relates to locking devices for dumping car bodies and more particularly to a device for automatically locking the body of a cinder or hot metal car in upright position after it has been returned from a dumping position. An object is to provide an improved device of the above class which shall be positive in action and of simple construction. A further object is to provide a lock which may be slightly yieldable to lessen shocks.

In the preferred embodiment, the locking device is shown applied to dumping cars of a construction similar to that disclosed in the patent to Astrom No. 889,866 of June 2, 1908, and comprises a latch to engage a trunnion lug for retaining the car body in upright position. The latch is mounted on a platform at the end of the underframe and is adapted to automatically engage said lug as the car body returns from dumping position. A control rod is provided to release the latch, while a weight or its equivalent is used to return the latch to a position ready to automatically engage the lug as the car body returns to upright. In one embodiment of this invention, the pivotal support for the latch is mounted so as to be yieldable against a spring to reduce the shock of the returning car body. This invention is applicable to car bodies which are adapted to dump to only one side, as well as to those capable of dumping to either side. When applied to a car body capable of dumping in only one direction, only one latch is used, whereas two latches are present in those forms of this invention applied to car bodies capable of dumping to either side.

In the drawings,

Figure 1 is a side view showing an end of a car body adapted for dumping in either direction;

Fig. 2 is a section on the line 2ª—2ª of Fig. 1 with part of the rack broken away;

Fig. 3 is a detail of the latch shown in Fig. 1 with the control bar removed; and Fig. 4 shows a modified form of the present invention which is not yieldably supported.

For purposes of illustration, the present invention has been embodied in a car body capable of dumping to either side and in which two latches instead of only one are used. Numeral 10 represents the underframe mounted at each end on trucks 11 supplied with a customary coupling equipment 12 and having on top a platform 13 for supporting the motor 20, track 14 and rack 18. This construction is of the same type as that disclosed in the patent to Astrom No. 889,866, June 2, 1908, in which a dumping car body 17 is mounted in a bail 16 provided with trunnions 15 and gear 19. A fluid pressure motor 20 mounted in the supports 21 imparts a sidewise motion to the trunnions which rotate on the tracks 14. During this movement the cooperation between the gear 19 and the rack 18 causes the car body to tilt. The motion of the motor is transmitted through a U-shaped member 22 to the particular actuating pin 23 in the usual manner, according to the direction of movement. Secured to the bail 16, adjacent the trunnion bearing 15 is a lug 24 adapted to be engaged by the latch 25 pivoted to pin 26 constituting a rigid support mounted on member 29 above the platform 13. Since the latch is usually located in a position not conveniently accessible, a control bar 27 may be extended to the outside or some more convenient location for the operator. As illustrated, the latch is made in the shape of a bell crank with a weight 28 secured on one end and serving the purpose of keeping the latch in engagement with the lug 24 and also serving to move the latch inwardly as shown in Fig. 2 when the controlling bar 27 has been released. The top end portion 30 of the latch is tapered or otherwise shaped for cooperation with the lug so that as the car body returns from a dumping position, the latch will be automatically moved to engage the lug as the car body attains an upright position. A stop projection 31 is provided to preclude excessive movement of the control bar 27 and prevent the weight 28 being moved to the outside of the pivot 26. From Figs. 2 and 3 it will be seen that the latch and its pivot are mounted in a yoke member 32 provided with a downwardly extending stem 34 and resting upon the housing 33. The lower end of the stem 34 is provided with a threaded nut and washer 35 adapted to retain the spring 36 in position between the washer 35 and the upper end of the housing 33.

While two latches have been illustrated in Fig. 2 because the car body is adapted for tilting in either direction it will be understood that a single latch is sufficient for a car body capable of tilting in only one direction.

In operation, movement of the control rod 27 outwardly releases either latch and enables the car body to be tilted toward the side opposite the released latch. When the trunnion lug 24 is moved a sufficient distance to clear the latch, the control rod may be released and the weight 28 moves the latch inwardly to a position slightly inside that shown in Fig. 2. As the car body returns from dumping position, the projecting lug 24 cooperates with the beveled surface 30 at the end of the latch and since the support for the latch is not downwardly yieldable, the latch is moved outwardly and then inwardly until in the locking position shown by Fig. 2. Since the sudden engagement between the latch and lug may jar the support, the latch is made upwardly yieldable in the embodiment illustrated by Fig. 2 where it will be seen the yoke member 32 and stem 34 may be moved upwardly against the compression of the spring 36.

In Fig. 4 is shown a modification in which the latch is not yieldably mounted but is instead attached directly and rigidly to the support 29 by the bracket 37 which may be bolted or otherwise secured to the support 29.

Among the advantages of the present invention may be mentioned the simplicity of construction whereby the dumping car body is retained in its upright position. The only attention necessary to be given this locking device is to move the control rod 27 to release the latch. After releasing the control rod the rest of the latch movements are automatic since the weight 28 moves the latch inwardly to a position where the beveled surface 30 is adapted to be engaged by the returning lug and the weight 28 also retains the latch in locked position. Another advantage of this invention resides in the preliminary nature of the locking device whereby the latch cooperates with the car body or trunnion directly and without the inner position of any connecting or intermediate links.

What I claim is:

1. In combination with a car body mounted on trunnions, of a motor for tilting said car body through one of said trunnions, a locking device to retain said car body in an upright position, said device comprising an automatically engaging pivotal latch adjacent one side of said trunnion, a control rod for releasing said latch, a weight in co-operation with said latch to return the same to engaging position upon release of said control rod, and stops to retain the weight continually on one side of the latch pivot.

2. The combination with a tilting car body, of trunnions for supporting the same, trucks below said trunnions, a lug adjacent one trunnion, a pivotal latch adapted to co-operate with the lug and lock the car body in upright position, a support for said latch secured to and located above one of the trucks, the outer end portion of the latch being shaped to automatically engage said lug on return of the car body from dumping position, an operating bar for unlocking said latch, and a weight for moving the latch to engaging position and for retaining the same in co-operation with the lug, said latch being substantially upright and engaging a substantially horizontal surface of said lug when in co-operation therewith.

3. The combination with a car body, of trunnions on which the same is supported for dumping, a motor for actuating said car body, and means yieldably locking said car body in upright position.

4. A locking device for a trunnion comprising a pivotal latch, a support for said latch, said support being yieldable to reduce shocks.

5. The combination with a double dump car body mounted on trunnions, of a pair of trucks one at each end of said car body, a motor on one of said trucks for tilting the car body, a pair of pivotal latches supported on a truck, lugs one adjacent each side of a trunnion for co-operation with said latches, the end portion of each latch being shaped to automatically engage its lug on return of the car body to upright position, means for disengaging either of said latches, mechanism for returning each latch to engaging position upon the release of said means, and stops to limit the movement of said latches in each direction.

6. The combination with a trunnion, of a lug connected thereto, a pivotal latch for engagement with the lug and locking the trunnion, the end portion of the latch being shaped to be automatically engaged with the lug, means for unlocking the latch, means for moving the latch to a position for engaging the lug upon release of the unlocking means, a support against which the latch is adapted to be unyieldingly pressed during automatic engagement with and while being moved by said lug, said support being yieldable to permit limited upward movement of the latch with said lug.

7. In combination with a trunnion, of a lug connected thereto, a pivotal latch for co-operation with said lug to retain said trunnion in a predetermined position, a support for the latch, said latch and lug being shaped to effect automatic engagement, means for unlocking said latch, means for returning the latch from an unlocked position to one where it is adapted to be engaged by the lug, said last mentioned means also being adapted to retain the latch in locking position, a spring adapted to permit a limited yielding of the latch with said lug, and means connected to said support to prevent movement thereof in the opposite direction from its normal position.

8. The combination with a car body, of trunnions on which the same is supported for dumping, a motor for actuating said car body, and means including a spring for yieldably locking said car body, which is adapted to permit limited movement of the car body on its trunnions against the action of said spring.

Signed at New York in the county of New York and State of New York this 14th day of August A. D. 1922.

JOHN H. OLSON.